(12) United States Patent
Shani et al.

(10) Patent No.: US 10,509,719 B2
(45) Date of Patent: Dec. 17, 2019

(54) AUTOMATIC REGRESSION IDENTIFICATION

(71) Applicant: ENTIT Software LLC, Sunnyvale, CA (US)

(72) Inventors: Inbar Shani, Yehud (IL); Ayal Cohen, Yehud (IL); Yaron Burg, Yehud (IL)

(73) Assignee: MICRO FOCUS LLC, Santa Clara, CA (US)

( * ) Notice: Subject to any disclaimer, the term of this patent is extended or adjusted under 35 U.S.C. 154(b) by 24 days.

(21) Appl. No.: 15/758,284

(22) PCT Filed: Sep. 8, 2015

(86) PCT No.: PCT/US2015/048843
§ 371 (c)(1),
(2) Date: Mar. 7, 2018

(87) PCT Pub. No.: WO2017/044069
PCT Pub. Date: Mar. 16, 2017

(65) Prior Publication Data
US 2018/0267888 A1 Sep. 20, 2018

(51) Int. Cl.
*G06F 11/36* (2006.01)
*G06F 16/901* (2019.01)
*G06F 8/71* (2018.01)

(52) U.S. Cl.
CPC ........... *G06F 11/3688* (2013.01); *G06F 8/71* (2013.01); *G06F 11/3692* (2013.01); *G06F 16/9024* (2019.01)

(58) Field of Classification Search
CPC .............. G06F 11/3688; G06F 11/368; G06F 11/3692; G06F 16/9024; G06F 8/71
(Continued)

(56) References Cited

U.S. PATENT DOCUMENTS 7,490,081 B2 2/2009 Best et al.
7,614,043 B2 11/2009 Ognev et al.
(Continued)

FOREIGN PATENT DOCUMENTS

| CN | 102495798 | 6/2012 |
|---|---|---|
| WO | WO2014153273 | 9/2014 |
| WO | WO-2016093803 A1 | 6/2016 |

OTHER PUBLICATIONS

Owen, "App performance monitoring closes gap between testing and production", Search Software Quality, posted online in Feb. 2014, 7 pages.
(Continued)

*Primary Examiner* — Marina Lee

(57) ABSTRACT

Example implementations relate to automatically identifying regressions. Some implementations may include a data capture engine to capture data points during test executions of the application under test. The data points may include, for example, test action data and application action data. Additionally, some implementations may include a data correlation engine to correlate each of the data points with a particular test execution of the test executions, and each of the data points may be correlated based on a sequence of events that occurred during the particular test execution. Furthermore, some implementations may also include a regression identification engine to automatically identify, based on the correlated data points, a regression between a first version of the application under test and a second version of the application under test.

19 Claims, 9 Drawing Sheets

(58) Field of Classification Search
USPC .................................................. 717/124–135
See application file for complete search history.

(56) References Cited

U.S. PATENT DOCUMENTS

| | | | | |
|---|---|---|---|---|
| 8,185,877 | B1* | 5/2012 | Colcord | G06F 9/44 |
| | | | | 717/124 |
| 8,276,126 | B2 | 9/2012 | Farnham et al. | |
| 8,615,739 | B2 | 12/2013 | Nir et al. | |
| 8,701,092 | B1* | 4/2014 | Colcord | G06F 9/44 |
| | | | | 717/124 |
| 10,146,753 | B2* | 12/2018 | Tsai | G06F 17/2247 |
| 2006/0225048 | A1 | 10/2006 | Jakubiak | |
| 2010/0005341 | A1 | 1/2010 | Agarwal et al. | |
| 2011/0016452 | A1 | 1/2011 | Gorthi et al. | |
| 2012/0023373 | A1 | 1/2012 | Chen | |
| 2013/0024469 | A1 | 1/2013 | Cai et al. | |
| 2014/0040666 | A1* | 2/2014 | Goetz | G06F 11/3688 |
| | | | | 714/32 |
| 2014/0325480 | A1 | 10/2014 | Bhagavatula | |
| 2014/0372983 | A1* | 12/2014 | Presley | G06F 11/368 |
| | | | | 717/124 |
| 2015/0082280 | A1 | 3/2015 | Betak et al. | |
| 2016/0062765 | A1* | 3/2016 | Ji | G06F 8/75 |
| | | | | 717/122 |
| 2017/0329664 | A1* | 11/2017 | Nitsan | G06F 11/32 |
| 2018/0137036 | A1* | 5/2018 | Shani | G06F 11/3684 |

OTHER PUBLICATIONS

Unknown, "Directed Acyclic Graph", Wikipedia, Dec. 26, 2014, 10 pages. <https://web.archive.org/web/20141226023948/https://en.wikipedia.org/wiki/Directed_acyclic_graph>.

Unknown, "Test Result Analysis and Reports—Load Testing with LoadRunner Tutorial #3", Software Testing Complete Guide, Dec. 26, 2014, 6 pages. <https://web.archive.org/web/20141226010737/https://www.softwaretestinghelp.com/loadrunner/hp-loadrunner-tutorial-8/>.

Chittimalli, P.K. et al., "Re-computing Coverage Information to Assist Regression Testing," (Research Paper), Jul. 4, 2007, 11 pages.

International Search Report and Written Opinion dated Jun. 7, 2016, PCT Patent Application No. PCT/US2015/048843 dated Sep. 8, 2015, Korean Intellectual Property Office pp. 11.

* cited by examiner

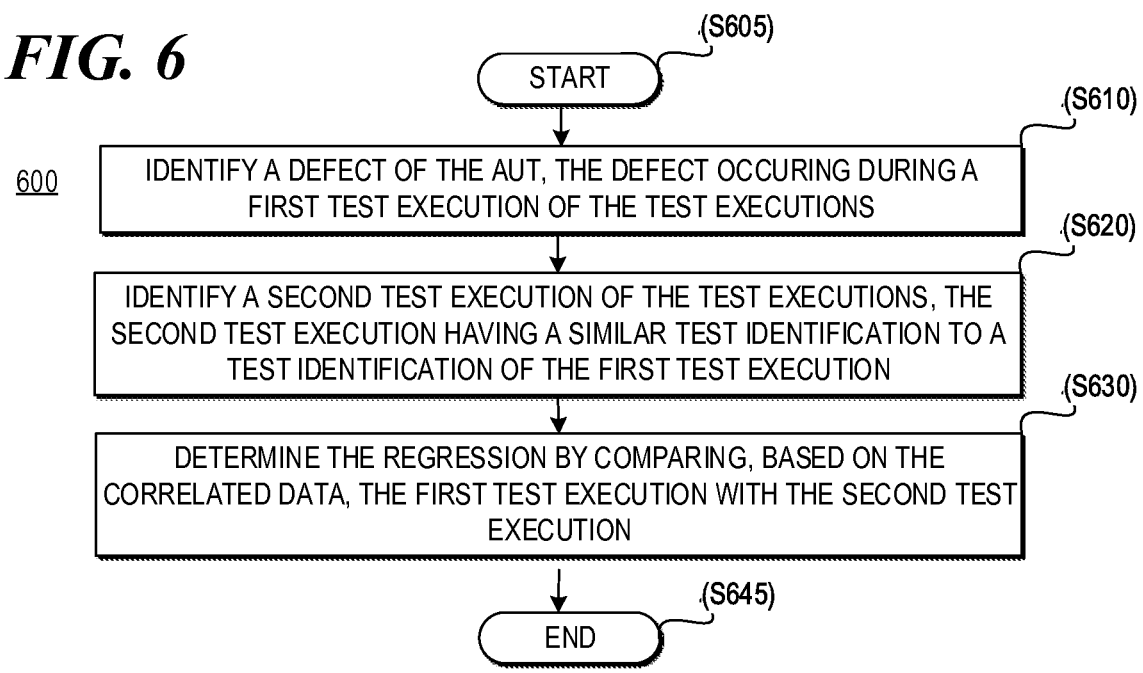
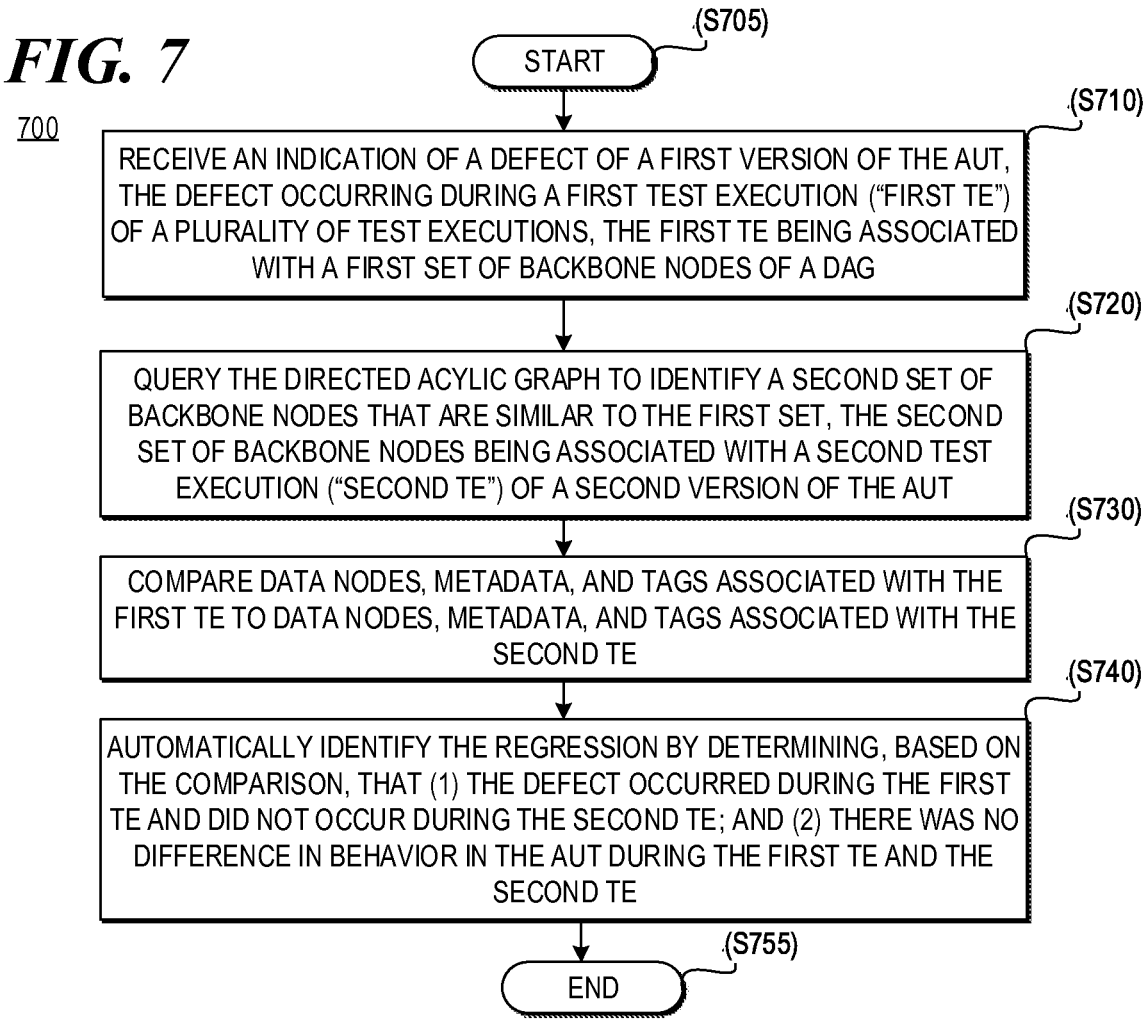

800

REGRESSION IDENTIFICATION INTERFACE

| | V0.1 | V0.15 | V0.2 | V0.21 | V0.22 | V0.25 | V0.5 | V1.0 | V1.01 |
|---|---|---|---|---|---|---|---|---|---|
| Similar Test | | | | x | x | x | x | x | x |
| Similar Functionality | | | | | x | | x | x | x |
| Defect Detected | | | | | | | x | | x |

AUTOMATIC REGRESSION IDENTIFICATION

BACKGROUND

Changes to an application or an application environment may result in degradation of application performance. For example, when developers change application code, those changes may accidentally introduce defects into the application. To help identify these defects, the application may be tested for regressions. If the regression testing identifies that the change resulted in an application defect that was not present in an earlier version of the application, that defect may be considered to be a regression.

BRIEF DESCRIPTION OF THE DRAWINGS

The following detailed description references the drawings, wherein:

FIG. 6 is a flow chart of an example process for automatic regression identification consistent with disclosed implementations;

FIG. 7 is a flow chart of an example process for automatic regression identification consistent with disclosed implementations;

FIG. 11 is an example illustration of a regression interface consistent with disclosed implementations.

DETAILED DESCRIPTION

Figure 1:
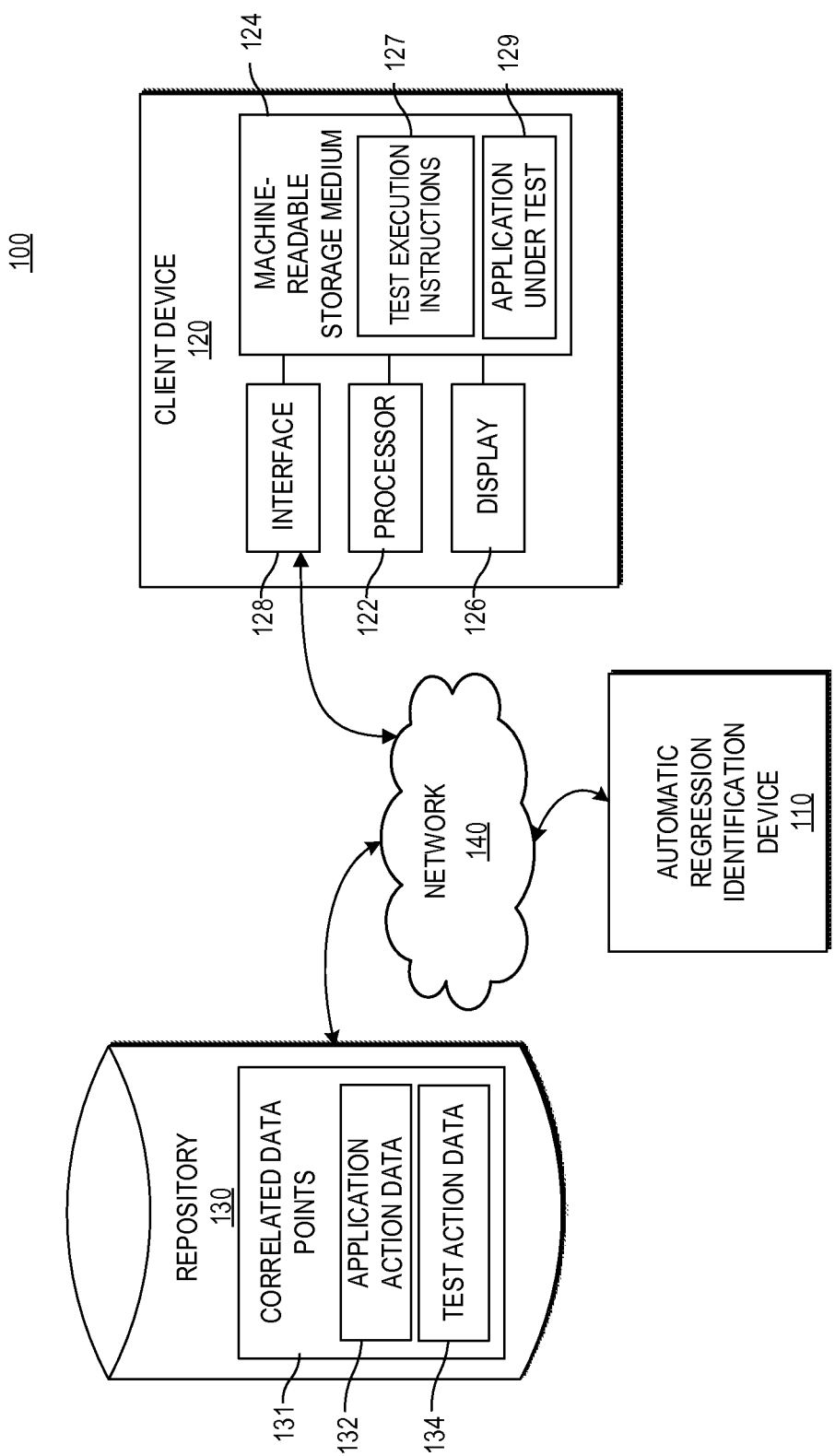
FIG. 1 is a block diagram of an example system for automatic regression identification consistent with disclosed implementations.

The following detailed description refers to the accompanying drawings. Wherever possible, the same reference numbers are used in the drawings and the following description to refer to the same or similar parts. While several examples are described in this document, modifications, adaptations, and other implementations are possible. Accordingly, the following detailed description does not limit the disclosed examples. Instead, the proper scope of the disclosed examples may be defined by the appended claims.

As discussed above, a regression may be an application defect that occurs in an application after a change, such as a change to the application code, a change to the application environment, and the like. For example, a regression may be a defect that is regressing previously stable application functionality. The question of whether a defect is a regression may depend on a number of factors, such as whether the test case was changed, whether the test implementation was changed, whether the test case was executed on previous builds of the application under test ("AUT"), whether there were other test cases that previously executed the same functionality and would have uncovered that defect before, whether the AUT was changed in such a way that the functionality is fundamentally different before and thus any defects should be considered "new" defects rather than regressions, and many others factors. For a quality assurance engineer, manually checking all of these factors and determining the defects may not be feasible.

Some examples disclosed herein may help automatically identify regressions based on how the test was executed both in terms of the test steps themselves as well as how they influence the AUT. For example, some implementations may capture data points (including test action data and application action data) during test executions of the AUT, correlate each of the data points with a particular test execution of the test executions based on a sequence of events that occurred during the particular test execution, and automatically identify, based on the correlated data points, a regression between a first version of the AUT and a second version of the AUT.

Referring now to the drawings, FIG. 1 is a block diagram of an example system 100 for automatic regression identification consistent with disclosed implementations. System 100 may be implemented in a number of different configurations without departing from the scope of the disclosed examples. In the example shown in FIG. 1, system 100 may include a automatic regression identification device 110, a client device 120, a repository 130, and a network 140 for connecting automatic regression identification device 110 with client device 120 and/or repository 130.

Automatic regression identification device 110 may be a computing system that performs various functions consistent with disclosed examples. For example, automatic regression identification device 110 may be a server, a desktop computer, a laptop computer, and/or any other suitable type of computing device. In some examples, automatic regression identification device 110 may process information received from client device 120 and/or repository 130. For example, automatic regression identification device 110 may automatically identify a regression between a first version of an AUT and a second version of the AUT based on data captured from client device 120 and/or received from repository 130. Examples of automatic regression identification device 110 and certain functions that may be performed by device 110 are described in greater detail below with respect to, for example, FIGS. 2-11.

Client device 120 may be a computing system operated by a user. For example, client device 120 may be a desktop computer, a laptop computer, a tablet computing device, a mobile phone, and/or any other suitable type of computing device. In some examples, client device 120 may be a computing device to perform operations consistent with certain disclosed implementations. For example, client device 120 may be adapted to transmit data related to test executions of an AUT to automatic regression identification device 110, such as, for example, data related to identified defects of an AUT.

Client device 120 may include a processor to execute instructions stored in a machine-readable storage medium. In the example shown in FIG. 1, client device 120 may include a processor 122, a machine-readable storage medium 124, a display device 126, and an interface 128.

Processor 122 of client device 120 may be at least one processing unit (CPU), microprocessor, and/or another hardware device to execute instructions to perform operations. For example, processor 122 may fetch, decode, and execute instructions stored in machine-readable storage medium 124 (such as test execution application instructions 127 and/or AUT instructions 129) to test an AUT. While in the example shown in FIG. 1 the AUT resides on client device 120, test execution instructions 127 and/or the AUT 129 may reside on different machines and/or may span multiple computing systems. Machine-readable storage medium 124 may be any electronic, magnetic, optical, or other non-transitory storage device that stores instructions executed by processor 122. Display 126 may be any type of display device that presents information, such as a user interface of an AUT, a test verification interface, and the like, to a user (e.g., a tester) operating client device 120. Interface 128 may be any combination of hardware and/or programming that facilitates the exchange of data between the internal components of client device 120 and external components, such as automatic regression identification device 110. In some examples, interface 128 may include a network interface device that allows client device 120 to receive and send data to and from various components, such as to and from automatic regression identification device 110 via network 140.

Repository 130 may be any type of storage system configuration that facilitates the storage of data. In some implementations, repository 130 may facilitate the locating, accessing, and retrieving of data points captured during test executions of an AUT (e.g., SaaS, SQL, Access, etc. databases). For example, repository 130 may store correlated data points 131, which may include application action data 132 and test action data 134 (described in further detail below). While in the example shown in FIG. 1 the correlated data points 131 reside in repository 130, any portion of the correlated data points 131 may reside on different storage systems.

Repository 130 can be populated by a number of methods. For example, automatic regression identification device 110 may populate repository 130 with data points captured and correlated by automatic regression identification device 110, and store the correlated data points 131 in repository 130. In some implementations, the data points may be stored as a directed acyclic graph ("DAG"). Traditionally, a DAG is a directed graph formed by a collection of vertices (e.g., a fundamental unit of which the graph is formed) and directed edges (e.g., an edge that points from a first vertex in the collection of vertices to a second vertex in the collection of vertices). A DAG, as used herein, doesn't necessarily mean a graphic representation of the data included in a traditional DAG. Instead, a DAG as used herein may include the graphic representation and/or a data structure that stores the data points in a manner that allows system 100 to determine data represented by the traditional DAG (e.g., categorization of the data points, directed edges associated with particular data points, and/or vertices associated with the data points). In some examples, the data structure may be an array, a record, a database entry, a lookup table, a hash table, a map, a tree, a linked list, and/or any other type of data structure. An example of a DAG consistent with disclosed implementations is discussed in more detail below with respect to, for example, FIG. 5.

While in the example shown in FIG. 1 repository 130 is a single component external to components 110 and 120, repository 130 may comprise separate components and/or may be part of devices 110, 120, and/or another device. In some implementations, repository 130 may be managed by components of device 110 and/or other devices that are capable of accessing, creating, controlling and/or otherwise managing data remotely through network 140.

Network 140 may be any type of network that facilitates communication between remote components, such as automatic regression identification device 110 and client device 120. For example, network 140 may be a local area network (LAN), a wide area network (WAN), a virtual private network, a dedicated intranet, the Internet, and/or a wireless network.

The arrangement illustrated in FIG. 1 is simply an example, and system 100 may be implemented in a number of different configurations. For example, while FIG. 1 shows one automatic regression identification device 110, client device 120, repository 130, and network 140, system 100 may include any number of components 110, 120, 130, and 140, as well as other components not depicted in FIG. 1. For example, system 100 may omit any of components 110, 120, 130, and 140, and/or the functionality of at least one of components 110, 120, 130, and 140 may be incorporated into another component (e.g., components 110, 120, 130, 140, and/or a component not shown in FIG. 1).

Figure 2:
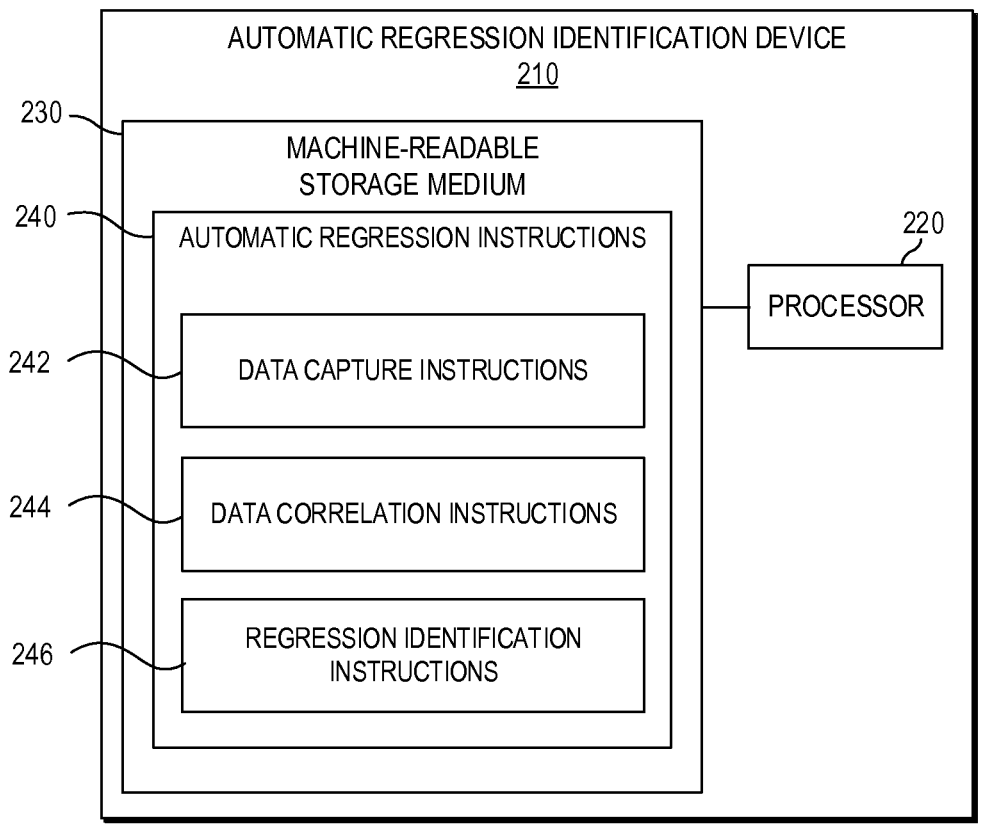
FIG. 2 is a block diagram of an example automatic regression identification device consistent with disclosed implementations.

FIG. 2 is a block diagram of an example automatic regression identification device 210 consistent with disclosed implementations. In certain aspects, automatic regression identification device 210 may correspond to automatic regression identification device 110 of FIG. 1. Automatic regression identification device 210 may be implemented in various ways. For example, device 210 may be a special purpose computer, a server, a mainframe computer, and/or any other suitable type of computing device. In the example shown in FIG. 2, automatic regression identification device 210 may include a processor 220 and a machine-readable storage medium 230.

Processor 220 may be at least one processing unit (CPU), microprocessor, and/or another hardware device to execute instructions to perform operations. For example, processor 220 may fetch, decode, and execute automatic regression instructions 240 (e.g., instructions 242, 244, and/or 246) stored in machine-readable storage medium 230 to perform operations consistent with disclosed examples.

Machine-readable storage medium 230 may be any electronic, magnetic, optical, and/or other physical storage device that stores executable instructions. Thus, machine-readable storage medium 230 may be, for example, memory, a storage drive, an optical disc, and the like. In some implementations, machine-readable storage medium 230 may be a non-transitory machine-readable storage medium, where the term "non-transitory" does not encompass transitory propagating signals. Machine-readable storage medium 230 may be encoded with instructions that, when executed by processor 230, perform operations consistent with disclosed implementations. For example, machine-readable storage medium 230 may include instructions that perform operations to automatically identify a regression by capturing data points during test executions of an AUT, correlating each of the data points with a particular test execution of the AUT, and automatically identifying, based on the correlated data points, a regression between a first version of the AUT and a second version of the AUT. In the example shown in FIG. 2, machine-readable storage medium 230 may include data capture instructions 242, data correlation instructions 244, and regression identification instructions 246.

Data capture instructions 242 may function to capture data points during test executions of an AUT. In some implementations, when data capture instructions 242 are executed by processor 220, data capture instructions 242 may cause processor 220 and/or another processor to capture data points during test executions of the AUT. For example, data capture instructions 242 may cause processor 220 and/or another processor to access, receive, or otherwise obtain the data points from one or more computing systems that execute the test and/or implement the AUT during the test executions. In some examples, the data points may be captured by installing agents on various physical or virtual system components to monitor how the particular component(s) function and to transmit the data points to a storage device, such as a storage device associated with automatic regression identification device 110. The transmitted data points may then be received and/or captured by automatic regression identification device 110. The agents may be simple (e.g., agents monitoring a central processing unit ("CPU") that may simply ask an operating system what the CPU use level is) or complex (e.g., agents integrated with a testing tool that follow all of the test steps during test executions of an AUT). Alternatively (or in combination with the use of agents) the information may be monitored agentlessly. For example, a monitoring server may query various component(s) for information about the component (s) memory usage.

In some implementations, the captured data points may include application action data that includes data related to actions performed by the application under test in response to test actions performed during the test executions, the application action data may include data related to various levels of the AUT, such as a user interface level (e.g., UI snapshots, UI object extractions, etc.), a code level (e.g., code executed behind the UI), a network communication level (e.g., network communications between client device 120 and automatic regression identification device 110), a database level (e.g., databases accessed by the AUT during test execution), and an environment level (e.g., data related to the environment of the AUT such as data related to hardware (e.g., device build, CPU usage, memory usage, resource usage, etc.) and programming (e.g., operating system, browser, etc.) that are related to the execution of the test of the AUT (e.g., server logs) and/or that relate to the execution of the AUT itself (e.g., application server errors)). In some examples, the captured data points may include test action data that includes data related to the test actions performed during the test executions, such as test actions and/or steps performed during the particular test execution (e.g., start test step (e.g., data indicating that the data point is related to the start of a test step), end test step (e.g., data indicating that the data point is related to the end of a test step), report test result step (e.g., data indicating that the data point is related to a particular result of a test step), complete test step (e.g., data indicating that the data point is related to the completion of an entire test), and/or a report test step (e.g., data indicating that the data point relates to reporting the results on the entire test)), and/or metadata related to the AUT (e.g., AUT version), the particular test execution state (e.g., test date/time, tester name, etc.), and the like. Examples of capturing data points during test executions of an AUT are described in further detail below with respect to, for example, FIGS. 2-11.

Data correlation instructions 244 may function to correlate data points. For example, when data correlation instructions 244 are executed by processor 220, data correlation instructions 244 may cause processor 220 to correlate each of the data points with a particular test execution of the AUT. In some implementations, the data points may be correlated based on a sequence of events that occurred during the particular test execution. For example, data correlation instructions 244 may cause processor 220 to generate a DAG and/or store the data in a manner that allows verification queries of the data. In some examples, the DAG and/or the correlated data points may be stored in a repository, such as repository 130. Examples of correlating data points are described in further detail below with respect to, for example, FIGS. 4 and 5.

Regression identification instructions 246 may function to identify, based on the correlated data points, a regression between a first version of the AUT and a second version of the AUT. For example, when regression identification instructions 246 are executed by processor 220, regression identification instructions 246 may cause processor 220 to identify a regression based on similarity between: (1) first tests executed related to the first version of the AUT and second tests executed related to the second version of the AUT; and (2) first application behaviors in response to the first tests and second application behaviors in response to the second tests. For example, if a first test on a newer version of the AUT and a second test on an older version of the AUT are similar and the application behaviors in response to the tests are similar, and a defect occurs in the first test but not the second test, the newer version may be considered to be a regression from the older version. In some implementations, the regression may be automatically identified by identifying an indication of a defect of the AUT (where the defect occurred during a first test execution), identifying, based on the correlated data, a second test execution that has a similar test identification to the test identification of the first test execution, and determining the regression by comparing, based on the correlated data, the first test execution with the second test execution. Examples of automatically identifying a regression are described in further detail below with respect to, for example, FIGS. 2-11. In some examples, the identification may be based on a generalized data sequence (i.e., a generic representation of a sequence of captured test action data). For example, regression identification instructions 246, when executed may function to query a repository (e.g., repository 130) to identify test executions that correspond with the generalized data sequence by ignoring generated content. For example, suppose that a user is clicking a specific button on a user interface. Data capture instructions 242, when executed, may capture the user interaction with the specific button, as well as other information local to the specific controls, specific environment, or specific session of the user (e.g., cookies produced with generated content), Regression identification instructions 246 may search the captured and correlated data based on a generalized data sequence by searching for information applicable to the context of the application (e.g., click button) as opposed to simply wrote data (e.g., content that while different may not be critical to application functionality).

Figure 3:
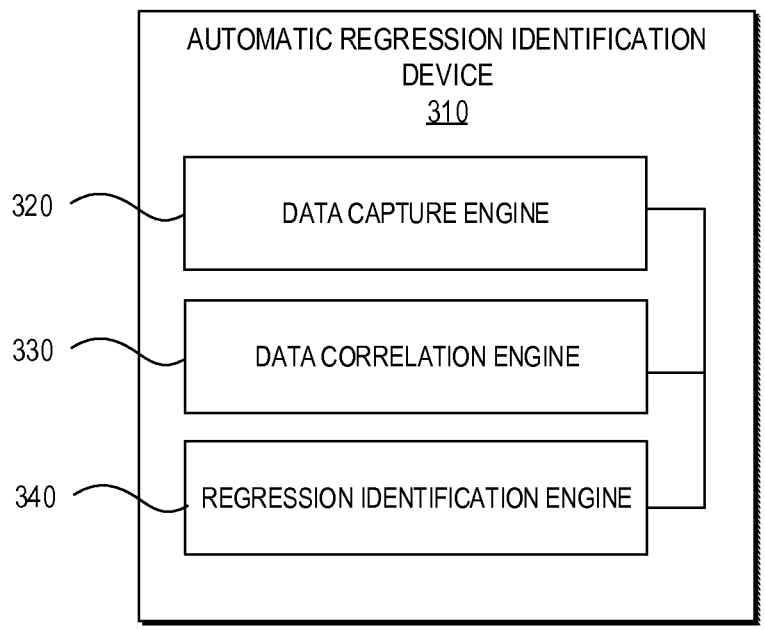
FIG. 3 is a block diagram of an example automatic regression identification device consistent with disclosed implementations.

FIG. 3 is a block diagram of an example automatic regression identification device 310 consistent with disclosed implementations. In certain aspects, automatic regression identification device 310 may correspond to automatic regression identification device 110 of FIG. 1 and/or automatic regression identification device 210 of FIG. 2. Device 310 may be implemented in various ways. For example, device 310 may be a special purpose computer, a server, a mainframe computer, and/or any other suitable type of computing system. In the example shown in FIG. 3, device 310 may include a data capture engine 320, a data correlation engine 330, and a regression identification engine 340.

Engines 320, 330, and 340 may be electronic circuitry for implementing functionality consistent with disclosed examples. For example, engines 320, 330, and 340 may represent combinations of hardware devices and programming to implement functionality consistent with disclosed implementations. In some examples, the functionality of engines 320, 330, and/or 340 may correspond to operations performed by automatic regression identification device 210 of FIG. 2, such as operations performed when automatic regression instructions 240 are executed by processor 220 (described above with respect to FIG. 2). In FIG. 3, data capture engine 320 may represent a combination of hardware and programming that performs operations similar to those performed when processor 220 executes data capture instructions 242. Similarly, data correlation engine 330 may represent a combination of hardware and programming that performs operations similar to those performed when processor 220 executes data correlation instructions 244, and regression identification engine 340 may represent a combination of hardware and programming that performs operations similar to those performed when processor 220 executes regression identification instructions 246.

Figure 4:
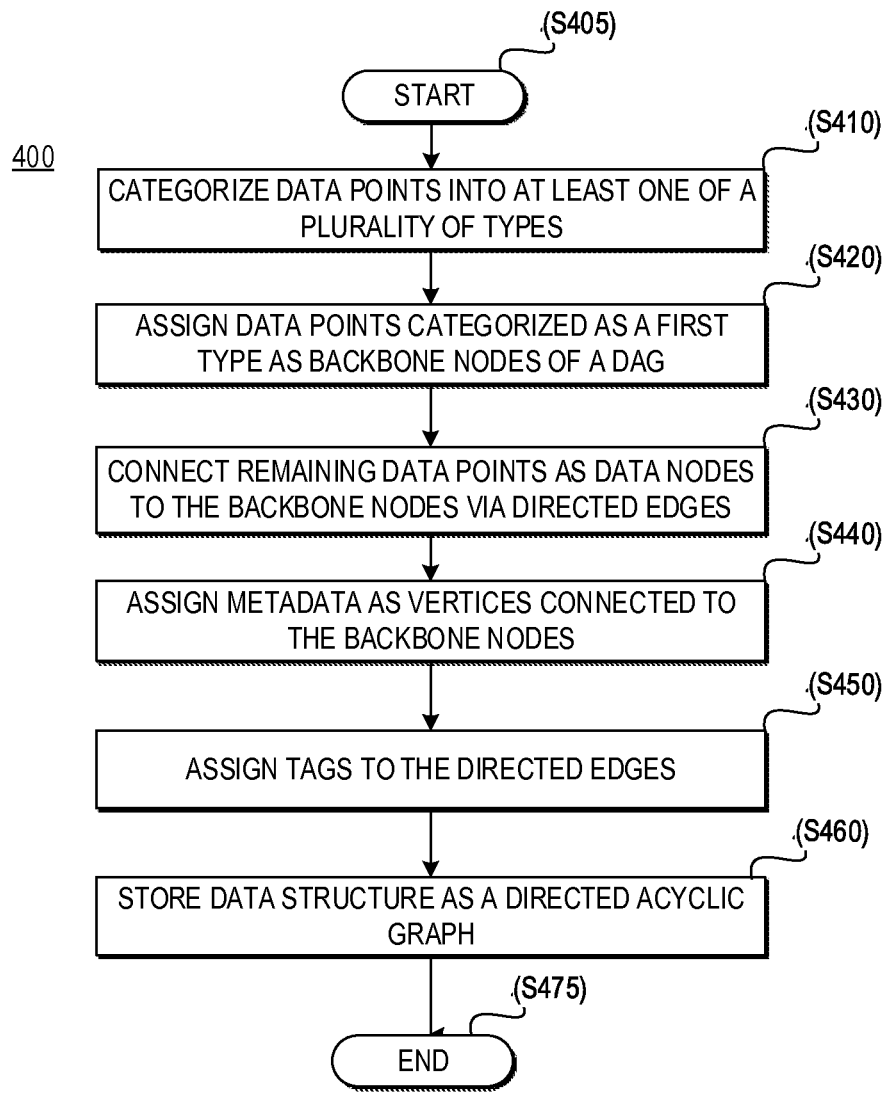
FIG. 4 is a flow chart of an example process for correlating data points consistent with disclosed implementations.

FIG. 4 is a flow chart of an example process 400 for correlating data points consistent with disclosed implementations. Although execution of process 400 is described below with reference to system 100 of FIG. 1 and/or specific components of system 100, other suitable systems and devices for execution of at least one step of process 400 may be used. For example, processes described below as being performed by automatic regression identification device 110 may be performed by automatic regression identification device 210, automatic regression identification device 310, and/or any other suitable device. Process 400 may be implemented in the form of executable instructions stored on a machine-readable storage medium and/or in the form of electronic circuitry.

Process 400 may start (step S405) after data points have been captured during test executions of an AUT. Once the data points have been captured, process 400 may function to correlate each of the data points by categorizing each of the data points into at least one of a plurality of types. In some implementations, the at least one of the plurality of types may include a first type (e.g., test steps). For example, the data points may be correlated by generating a DAG, such as DAG 500 of FIG. 5. In some implementations, the DAG may be generated based on timestamps associated with the data points. For example, process 400 may include categorizing the data points into at least one of a plurality of types (step S410). For example, the data points may be categorized based on steps of the test execution, data type (e.g., CPU, memory, UI object, user action, network packet, etc.), a particular user (e.g., an identify of the user who was running the test), AUT build (the specific build version of the AUT when the data points were captured), and/or any other suitable categorization. In some implementations, the plurality of types may include a first type. For example, the first type may be test actions of the test execution such as, for example, steps involved in tester interaction with a user interface of the AUT. As another example, the first type may be application actions of the test execution such as, for example, actions of the AUT that are performed in response to the test actions. The definition of the particular types may be predetermined, or may be based on input from a user. For example, a user may define the application action type as all actions completed by the AUT between a test action and a full update to a user interface (e.g., may transmit the user interface has been updated such that all of the text and/or graphics have fully loaded) of the AUT.

Process 400 may also include assigning data points categorized as the first type as backbone nodes of a DAG (step S420). For example, system 100 may assign the data points associated with test steps of the test execution as a backbone (e.g., a plurality of backbone nodes) of the DAG. Thus, in some implementations, the data points associated with test steps may be considered to be backbone nodes, and the remaining data points (e.g. data points associated with application actions) may be considered to be data nodes.

Process 400 may also include connecting remaining data points (e.g., a set of the data points that are not categorized as the first type) as data nodes to the backbone nodes via directed edges based on timestamps associated with the remaining data points (step S430). For example, the data points may be connected via directed edges from a first data point of the first type (e.g., a first test step of the test steps). In some examples, the data points may be connected based on a length of time between a time stamp associated with a particular data point of the captured data points, and a time stamp associated with the first test step. For example, system 100 may order the test steps in the backbone sequentially based on when the test steps were executed. Events associated with a particular test step may be traced and associated with the particular test step. For example, system 100 may trace UI objects. A UI scanner may run periodically and automatically identify structured objects in the UI, their attributes, and their values. As another example, system 100 may trace system events associated with a particular test steps by implementing a thread event monitor that monitors threads for a creation of an object, the run of an object, the termination of an object, and the like, and associate the creation, run, and/or termination of objects to a particular test event based on thread and object identifiers.

Process 400 may also include assigning the metadata as vertices connected to the backbone nodes (step S440). For example, system 100 may determine the elements of the backbone and may assign metadata (e.g., data points) traced to each particular element (e.g., each test step). For example, system 100 may trace the metadata based on time-relations (e.g., the event happened after a particular test step) or based on another suitable methodology (e.g., coloring network packets to trace them to a server code).

Process 400 may also include assigning tags to the directed edges to identify a type of relation between the vertices (step S450). In some implementations, system 100 may assign tags to the directed edges based on data received from the agents installed on the various physical or virtual system components. For example, the agents may include instructions, that when executed by a processor, compare an event occurring with the system to a list of rules. If the event matches a particular rule, the agent notes the tag association between events. For example, assume that the list of rules includes a use tagging rule that requires tagging a directed edge as "use" when a test step involves the usage of a browser. When a test step is executed that invokes an object named "browser," the agent may compare the invocation of the object to the list of rules and, based on the use tagging rule in the list, tag the directed edge as "use."

Process 400 may also include storing the DAG (step S460) in a storage device. In some implementations, the DAG may be stored in a storage device such as a non-transitory computer-readable storage medium (e.g. a machine-readable storage medium in automatic regression identification device 110, repository 130, and/or in another device). After the data points have been categorized (step S410), the data points have been assigned (step S420), the remaining data points have been connected (step S430), the metadata has been assigned as vertices (step S440), the tags have been assigned to directed edges (step S450), and/or the DAG has been stored (step S460), process 400 may end (step S475).

Figure 5:
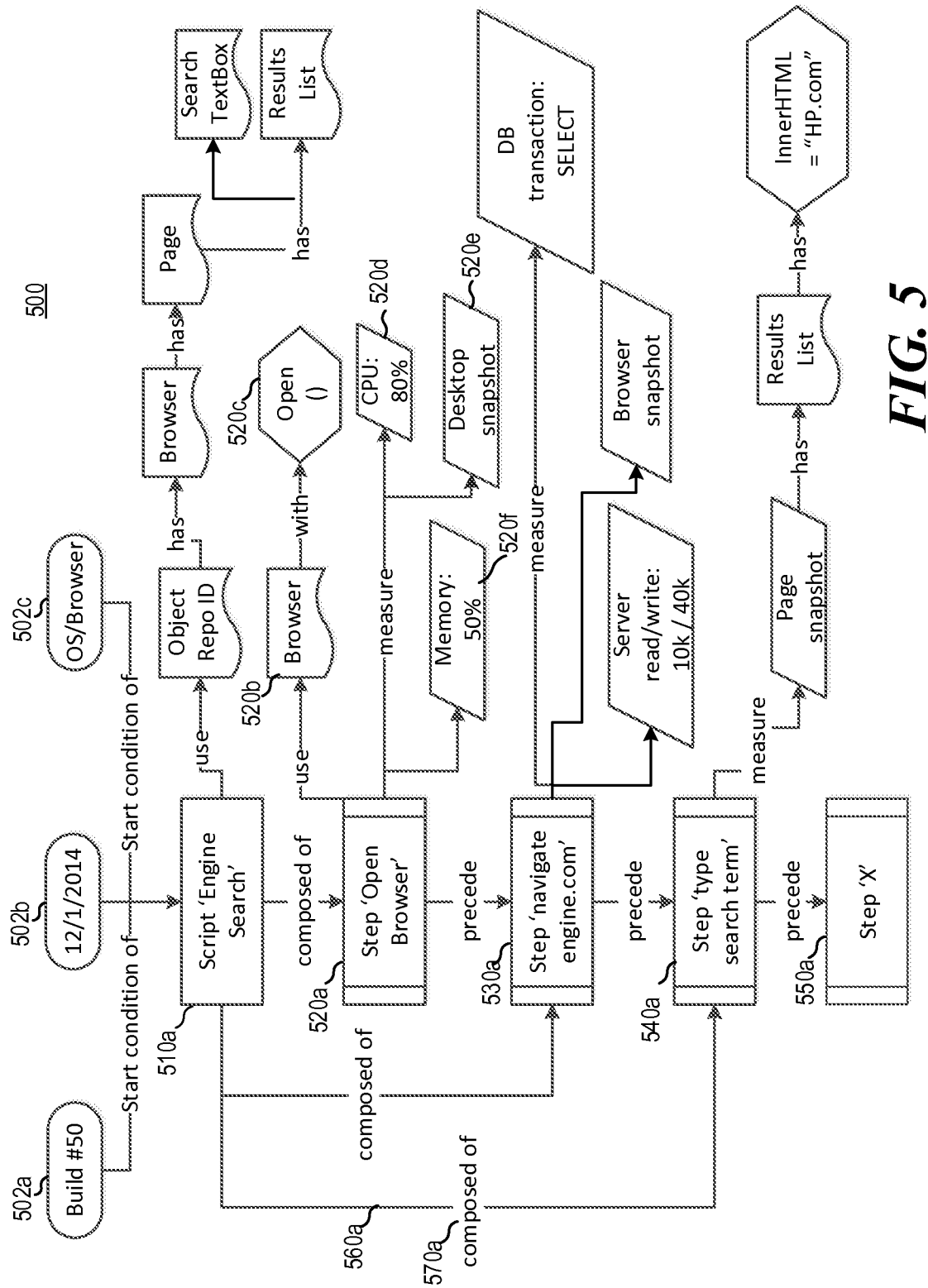
FIG. 5 is an example of a block diagram of an example directed acyclic graph ("DAG") consistent with disclosed implementations.

FIG. 5 is an example of a block diagram of a DAG 500 consistent with disclosed implementations. For example, DAG 500 may represent data points captured during test executions of an AUT that have been correlated based on a sequence of events that occurred during a particular test execution. Although the example DAG 500 is described below as being managed by, updated by, and/or otherwise utilized by system 100 of FIG. 1 and/or specific components of system 100, other suitable systems and devices for managing, updating, and/or otherwise utilizing DAG 500 may be used. For example, processes described below as being performed by automatic regression identification device 110 may be performed by automatic regression identification device 210, automatic regression identification device 310, and/or any other suitable device. Processes performed with respect to DAG 500 may be implemented in the form of executable instructions stored on a machine-readable storage medium and/or by electronic circuitry As shown in FIG. 5, DAG 500 may include data related to one or more particular test executions of an AUT. As shown in FIG. 5, the data includes data points related to application data 502*a* (e.g., build number), test data (e.g., the date of the test) 502*b*, and environment data 502*c* (e.g., operating system and browser type). DAG 500 also includes a backbone (the collective of test steps 510*a*, 520*a*, 530*a*, 540*a*, and 550*a*) which serves as the anchor for each of the vertices in the DAG. In some implementations, each data point may be considered to be a node within the DAG and may be classified based on the categorization of the particular data points (e.g., a backbone node (e.g., a test action node), an application action node, and the like). In this example, the backbone is comprised of test steps performed during test executions of the AUT, but DAGs consistent with disclosed implementations may use any suitable categorization of the data points as the backbone. For example, the backbone may be comprised according to user actions, recorded AUT web pages, UI objects, and/or any other suitable categorization.

The backbone of DAG 500 is correlated based on a sequence of events that occurred during the particular test execution, and thus the backbone links various ones of test steps 510*a*, 520*a*, 530*a*, 540*a*, and 550*a* together. In the example shown in FIG. 5, test step 510*a* occurred before test step 520*a*, test step 520*a* occurred before test step 530*a*, test step 530*a* occurred before test step 540*a*, and test step 540*a* occurred before test step S550*a*. Each portion of the backbone (e.g., each test step) in this example is connected via directed edges (only directed edge 560*a* has been labelled for clarity) from the first test step 510*a* of the test steps to the last test step 550*a* of the test steps, and the directed edges have been tagged (only tag 570*a* has been labelled for clarity) to identify a type of relation between the vertices. For example, test step 510*a* is directly linked with test steps 520*a*, 530*a*, and 540*a* via the directed edges, and the cause and/or effect of the linkage is shown in the tagging. For example, test step 510*a* is composed of test steps 520*a*, 530*a*, and 540*a*, test step 520*a* precedes test step 530*a*, test step 530*a* precedes test step 540*a*, and test step 550*a* precedes test step 540*a*.

Furthermore, as shown in FIG. 5, each test step in DAG 500 has additional information that was captured from the testing and/or application environment and was correlated with the particular test step. This additional information (e.g. metadata) has been assigned as vertices (only vertices 520*b*, 520*c*, 520*d*, 520*e*, and 520*f* have been labelled for clarity) connected to the backbone. For example, test step 520*a* relates to opening a browser. In this case, the step of opening the browser included using the browser (an object) and it was used with a specific action (in this case open). Thus, during this particular test execution state the browser was automatically opened by calling the open function of the browser. This information is modelled in DAG 500 not only by linking the test actions and what follows in terms of the AUT and its environment, but also by the tags that indicate the conceptual meaning of those steps. Each test action and the linking of the actions that follow in response to the test action in terms of the AUT and its environment may be considered to be a node chain of the DAG. Thus, in some implementations, there may be a node chain for each test action performed during the test execution.

FIG. 6 is a flow chart of an example process 600 for automatically identifying regressions consistent with disclosed implementations. Although execution of process 600 is described below with reference to system 100 of FIG. 1 and/or specific components of system 100, other suitable systems and devices for execution of at least one step of process 600 may be used. For example, processes described below as being performed by automatic regression identification device 110 may be performed by automatic regression identification device 210, automatic regression identification device 310, and/or any other suitable device. Process 600 may be implemented in the form of executable instructions stored on a machine-readable storage medium and/or in the form of electronic circuitry.

Process 600 may start (step S605) after a verification query of the correlated data points has been executed. For example, a user may utilize system 100 to compose a test comprising a plurality of test actions (e.g., test steps) and/or associated application actions performed in a particular order. The composition of the test may be performed by interacting with a visualization of results of the verification query. The verification query may include at least one of test action verification information (e.g., information to verify a test action) and application action verification information (e.g., information to verify an application action). For example, the verification query may be a series of conditional statements, questions, or any other suitable input. The order in which the test actions and/or the associated application actions are to be performed during the future test may be considered to be the verification execution sequence. Thus, in some examples, a verification execution sequence may include steps related to a plurality of verification queries, and a future test may comprise a verification execution sequence. In some implementations, the verification queries may be entered into a user interface using a domain-specific language (e.g., a computer language specialized to automatic regression identification device 110) and/or any other input (e.g., natural language) that may be translated by automatic regression identification device 110 into a domain-specific language, such as a DAG verification query (e.g., a query capable of obtaining relevant information from a DAG, such as DAG 500 of FIG. 5). In some implementations, the domain-specific language may be similar to behavior-driven-development syntax.

Process 600 may include identifying a defect of the AUT (step S610). In some implementations, automatic regression identification device 110 may identify a defect of the AUT based on a user interaction (e.g., button click, hover over, etc.) with a regression identification interface such as, for example, interface 1000 of FIG. 10. For example, automatic regression identification device 110 may receive an indication that a particular test action and/or application action resulted in a defect. For example, a user may interact with a regression identification interface by clicking on a particular visualized test action and/or application action node and/or clicking a button to identify regressions based on the clicked node, and information relating to the defect may be transmitted to automatic regression identification device 110. In some implementations, the defect may occur during a first test execution of a plurality of test executions. For example, the defect may occur during a particular test execution of a particular version of the AUT that has been captured and correlated by automatic regression identification device 110. This defect may or may not have occurred during other test executions of the particular version of the AUT or other versions of the AUT.

Process 600 may also include identifying, based on the correlated data, a second test execution of the plurality of test executions (step S620). In some implementations, the first test execution may occur after the second test execution. For example, the first test execution may relate to a later version of the AUT than the first test execution. In some implementations, the second test execution may have a similar test identification to a test identification of the first test execution. For example, the data points captured and correlated using, for example, the methods described herein may include a data point representing a test identification, such as a number, combination of letters and numbers, and or any other suitable text, graphics, and/or the like that may be used to identify the particular test and/or type of test being performed. Automatic regression identification device 110 may identify test executions in the correlated data that have similar (e.g., identical or resembling without being identical) test identifications to the test identification of the first test execution using, for example, a similarity algorithm. The similarity algorithm may compare the test identification of the first test execution to the test identifications of other test executions in the correlated data structure based on, for example, an exact comparison between data nodes, a fuzzy comparison between data nodes, and/or any other suitable basis of comparison.

Process 600 may also include determining the regression by comparing, based on the correlated data, the first test execution with the second test execution (step S630). In some implementations, the first test execution may include a first set of test steps and a first set of application behavior (e.g., behavior of the application in response to each of the test steps in the first set), and the second test execution may include a second set of tests steps and a second set of application behavior (e.g. behavior of the application in response to each of the test steps in the second set). In some implementations, the comparison may be based on a generalized data sequence, such as the generalized data sequence discussed above. For example, the comparison may be based on similarity between test actions and similarity between application actions performed in response to the test actions without a comparison of wrote (e.g., randomly generated) data.

In some implementations, step S630 may include determining whether the first set of test steps are the same as the second set of test steps. For example, automatic regression identification device 110 may compare the test action data related to the first test execution (and/or its associated generalized data sequence) to the test action data related to the second test execution (and/or its associated generalized data sequence) to determine whether they match. In some implementations, automatic regression identification device 110 may determine a match if the same test steps are performed in the same order during both the first and the second test executions.

In some implementations, step S630 may also include determining, using a similarity algorithm, whether the first set of application behavior and the second set of application behavior are similar. For example, automatic regression identification device 110 may compare the application action data related to the first test execution (and/or its associated generalized data sequence) to the application action data related to the second test execution (and/or its associated generalized data sequence) to determine whether they are similar. For example, automatic regression identification device 110 may apply a similarity algorithm that may compare the application actions based on, for example, an exact comparison between data nodes, a fuzzy comparison between data nodes, and/or any other suitable basis of comparison. The similarity may be the same as, similar to, or differ from other similarity algorithms described herein.

In some implementations, step S630 may also include determining whether the defect occurs during the second test execution. For example, automatic regression identification device 110 may query repository 130 to determine whether there is a data point correlated with the second test execution that is identical to the data point corresponding to the identified defect. If the first set of test steps are the same as the second set of test steps, the first set of application behavior is similar to the second set of application behavior, and the defect does not occur during the second test execution, then the regression is automatically identified. For example, in some implementations, automatic regression identification device 110 may identify the second test execution as including a regression and may query repository 130 to identify the version of the AUT corresponding to the second test execution. That version of the AUT may be considered to be a regression from the version of the AUT that corresponds to the first test execution. If, however, the defect does not occur during the second test execution, then a regression may not be automatically identified. For example, if the defect occurred during both test executions, the defect would not be considered to be a regression. Once steps S610, S620, and/or S630 have been performed, process 600 may end (step S645).

FIG. 7 is a flow chart of an example process 700 for automatically identifying regressions consistent with disclosed implementations. Although execution of process 700 is described below with reference to system 100 of FIG. 1 and/or specific components of system 100, other suitable systems and devices for execution of at least one step of process 700 may be used. For example, processes described below as being performed by automatic regression identification device 110 may be performed by automatic regression identification device 210, automatic regression identification device 310, and/or any other suitable device. Process 700 may be implemented in the form of executable instructions stored on a machine-readable storage medium and/or in the form of electronic circuitry.

Process 700 may start (step S705) after test executions of an AUT have been performed. For example, process 700 may start after data points during test executions have been captured and correlated using, for example, the methods described above. Process 700 may include receiving an indication of a defect of a first version of an AUT, where the defect occurs during a first test execution of the test executions (step S710). For example, the defect may be received using the methods described above with respect to, for example, step S610 of FIG. 6. In some implementations, the first test execution may be associated with a first set of backbone nodes of a plurality of backbone nodes of a DAG. For example, a DAG, such as DAG 500 of FIG. 5, may include a plurality of sets of backbone nodes. Each set of backbone nodes may correspond to a particular test execution of at least one version of the AUT. For example, a first set of backbone nodes may correspond to a first test execution of a first version of the AUT and a second set of backbone nodes may correspond to a second test execution of a second version of the AUT.

Process 700 may also include querying the DAG to identify a second set of backbone nodes that are similar to the first set, the second set of backbone nodes being associated with a second test execution of the second version of the AUT (step S620). For example, automatic regression identification device 110 may query repository 130 to identify a second set of backbone nodes that include a similar test identification to the test identification of the first test execution using, for example, the methods described above.

Process 700 may include comparing data nodes, metadata, and tags corresponding with the first test execution to data nodes, metadata, and tags corresponding to the second test execution (step S730). In some implementations, automatic regression identification device 110 may compare the data nodes, metadata, and tags to determine whether the data nodes, metadata, and tags are similar to each other using, for example, a similarity algorithm similar to other similarity algorithms described herein and/or any other suitable similarity algorithm.

Processes 700 may include automatically identifying the regression by determining, based on the comparison, that (1) the defect occurred during the first test execution and did not occur during the second test execution; and (2) there was no difference in behavior of the AUT during the first test execution and the second test execution (step S740). For example, automatic regression identification device 110 may parse through the data nodes corresponding with the second test execution to determine whether there is a data node that is the same as the data node in the first test execution that corresponds with the defect. As another example, automatic regression identification device 110 may apply a similarity algorithm to the application action data associated with the first test execution and the second test execution to determine whether they are similar. If they are similar, then the behavior of the AUT did not differ between the first test execution and the second test execution. If they are not similar, then the behavior of the AUT differed during the first test execution and the second test execution. For example, the AUT tested during the first test execution may have included new functionality or features that were not present during the second test execution. Once steps S710, S720, S730, and/or S740 have been performed, process 700 may end (step S755).

Figure 8:
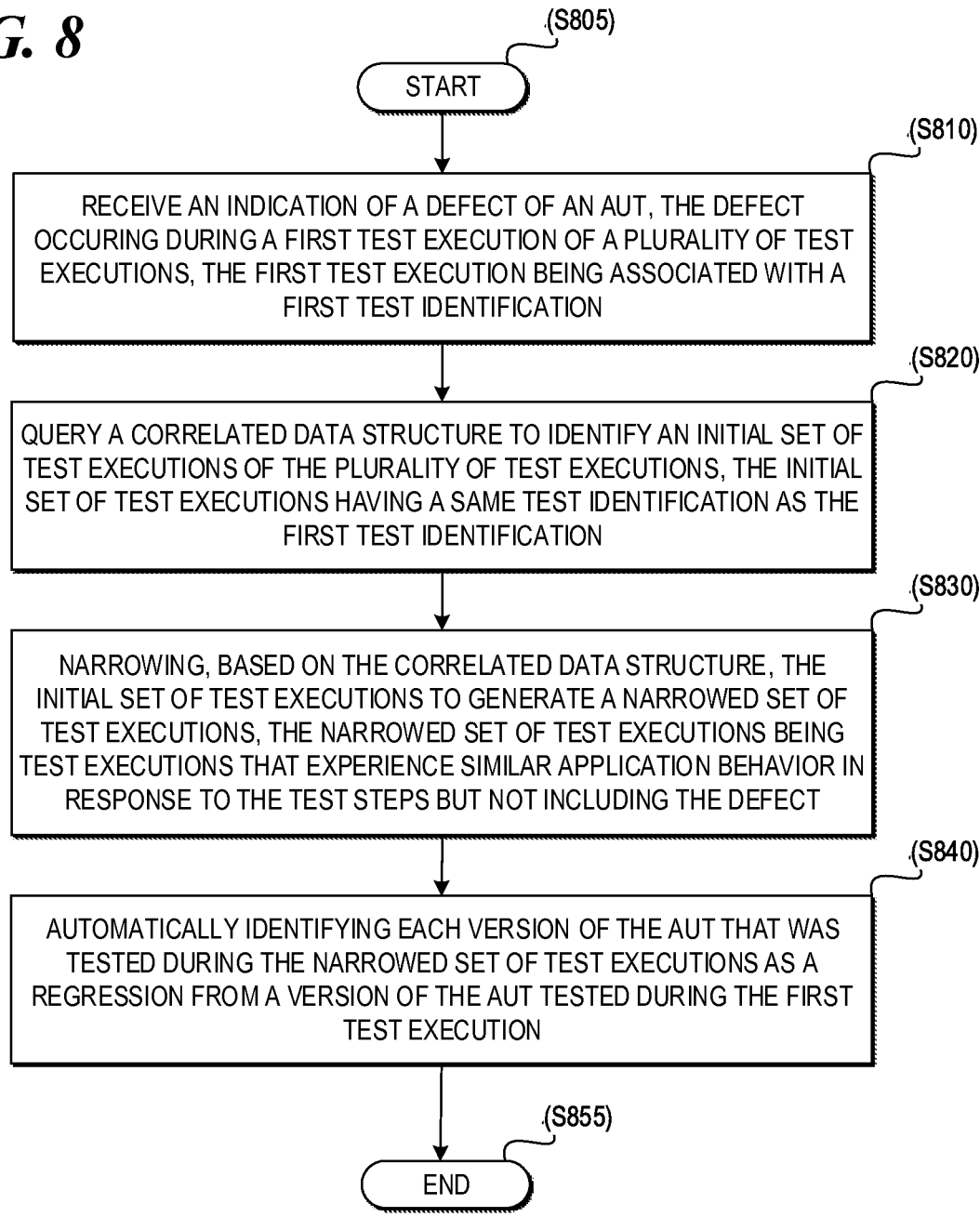
FIG. 8 is a flow chart of an example process for automatic regression identification consistent with disclosed implementations.

FIG. 8 is a flow chart of an example process 800 for automatically identifying regressions consistent with disclosed implementations. Although execution of process 800 is described below with reference to system 100 of FIG. 1 and/or specific components of system 100, other suitable systems and devices for execution of at least one step of process 800 may be used. For example, processes described below as being performed by automatic regression identification device 110 may be performed by automatic regression identification device 210, automatic regression identification device 310, and/or any other suitable device. Process 800 may be implemented in the form of executable instructions stored on a machine-readable storage medium and/or in the form of electronic circuitry.

Process 800 may start (step S805) after test executions of an AUT have been performed. For example, process 800 may start after data points during test executions have been captured and correlated using, for example, the methods described above. For example, the data points may be correlated into a correlated data structure that includes data points that have been correlated with a particular test execution of a plurality of test executions, where each of the data points are correlated based on a sequence of events that occurred during the particular test execution.

Process 800 may include receiving an indication of a defect of an AUT (step S810). In some implementations, the defect may occur during a first test execution of a plurality of test executions, and the first test execution may be associated with a first test identification. In some implementations, the defect may be received using, for example, the methods described above. For example, the defect may be received via an interaction with a regression interface that may be transmitted to automatic regression identification device 110 via a network, such as network 140, using, for example, the methods described above. In some implementations, each test execution may be given a test identification, such as the test identification described above with respect to FIG. 6, and the test identification of each test execution may be captured and correlated into a data structure such as a DAG using, for example, the methods described above.

Process 800 may also include querying a correlated data structure to identify an initial set of test executions of the plurality of test executions (step S820). In some implementations, the initial set of test executions may have the same test identification as the first test identification. For example, automatic regression identification device 110 may query repository 130 to identify test executions of the AUT that have an identical test identification to the test identification of the first test execution. The results of the query may be returned to automatic identification device 110 via, for example, network 140.

Process 800 may include narrowing, based on the correlated data structure, the initial set of test executions to generate a narrowed set of test executions (step S830). In some implementations, the narrowed set of test executions may be test executions that experience similar application behavior in response to the test steps, but not including the defect. For example, the results of the query returned to automatic regression identification device 110 may include an initial set of test executions (e.g., a set of test executions that had the same test identification number as the first test execution). Automatic identification device 110 may compare the application action data using, for example, the methods described above to determine whether each of the initial set of test executions have similar application behavior to the first test execution. The test executions that do not have similar application behavior may be discarded, and the test executions that remain may become the narrowed set of test executions.

Process 800 may include automatically identifying each version of the AUT corresponding to the narrowed set of test executions as a regression from a version of the AUT tested during the first test execution (step S840). For example, automatic regression identification device 110 may identify, based on the correlated data structure, the version of the AUT tested during the first test execution as well as the versions of the AUT tested during each test execution of the narrowed set of test executions. For example, automatic regression identification device 110 may query a repository, such as repository 130, to identify each version of the AUT in the set, and each version may be considered to be a regression from the version of the AUT corresponding to the first test execution. Information related to these regressions may be displayed in, for example, a regression identification interface, such as interface 1100 of FIG. 11. Once steps S810, S820, S830, and/or S840 have been performed, process 800 may end (step S855).

Figure 9:
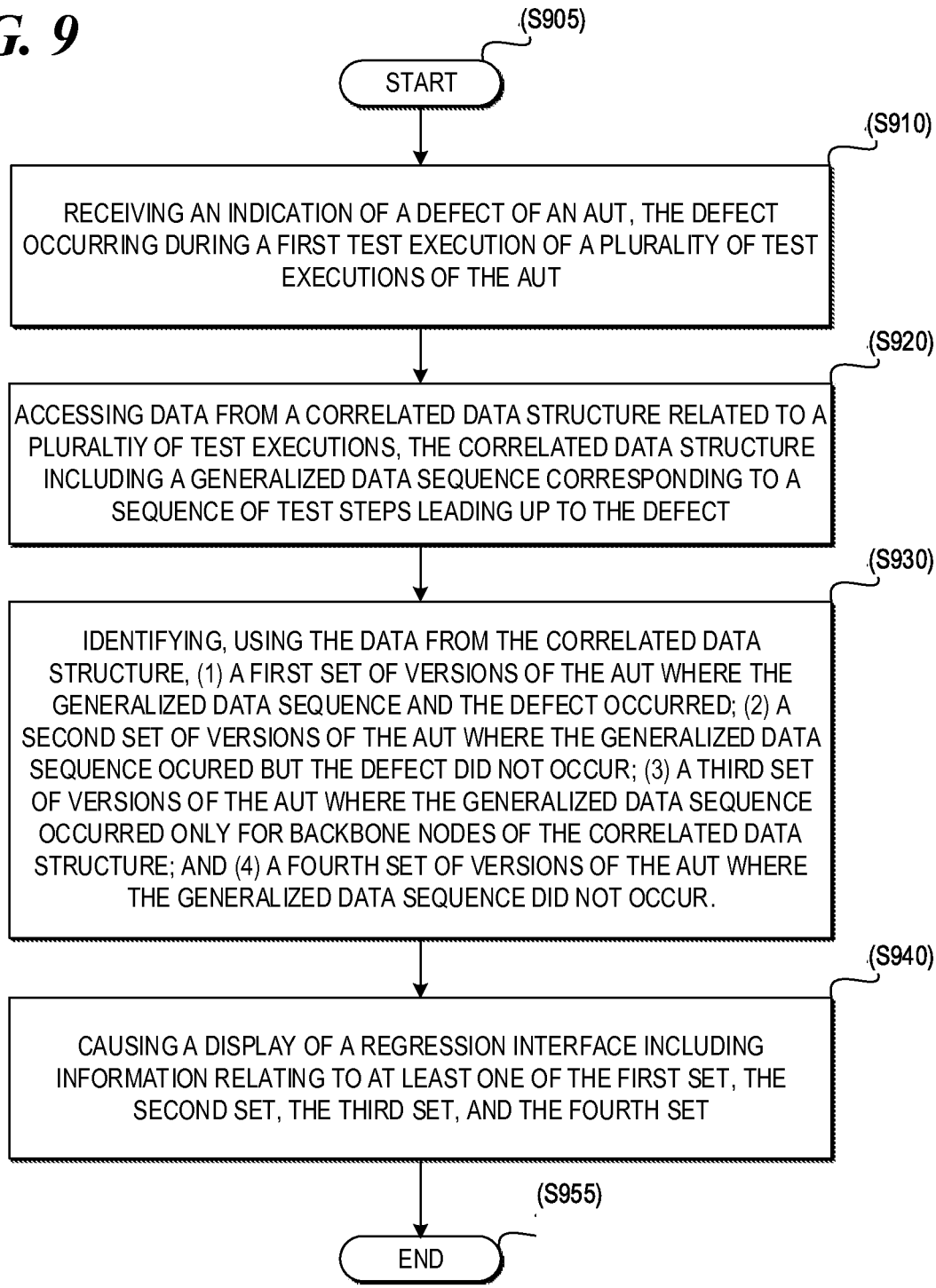
FIG. 9 is a flow chart of an example process automatic regression identification consistent with disclosed implementations.

FIG. 9 is a flow chart of an example process 900 for automatically identifying regressions consistent with disclosed implementations. Although execution of process 900 is described below with reference to system 100 of FIG. 1 and/or specific components of system 100, other suitable systems and devices for execution of at least one step of process 900 may be used. For example, processes described below as being performed by automatic regression identification device 110 may be performed by automatic regression identification device 210, automatic regression identification device 310, and/or any other suitable device. Process 900 may be implemented in the form of executable instructions stored on a machine-readable storage medium and/or in the form of electronic circuitry.

Process 900 may start (step S905) after test executions of an AUT have been performed. For example, process 900 may start after data points during test executions have been captured and correlated using, for example, the methods described above. Process 900 may include receiving an indication of a defect of an AUT (step S910). In some implementations, the defect may have occurred during a first test execution of a plurality of test executions of the application under test. For example, the indication of the defect may be received according to the processes described above (e.g., based on a user interaction with a regression identification interface), and the defect may be present in one or more test executions of the AUT.

Process 900 may also include accessing data from a correlated data structure related to a plurality of test executions (step S920). In some implementations, the correlated data structure may include a generalized data sequence corresponding to a sequence of test steps leading up to the defect. For example, the correlated data structure may be the same as or similar to the correlated data structures described above, and may include test action and/or application action data. In some implementations, the correlated data structure may include backbone nodes that represent data captured during a plurality of test executions, where the data corresponds with an interaction with a user interface of the AUT. For example, the backbone nodes may represent data generalized to represent user interactions performed on a regression identification interface.

Process 900 may also include identifying, using the data from the correlated data structure: (1) a first set of versions of the application under test where the generalized data sequence and the defect occurred; (2) a second set of versions of the application under test where the generalized data sequence occurred but the defect did not occur; (3) a third set of versions of the application under test where the generalized data sequence occurred only for backbone nodes of the correlated data structure; and/or (4) a fourth set of versions of the application under test where the generalized data sequence did not occur (step S940). For example, automatic regression identification device 110 may perform one or more queries to a storage device, such as repository 130, to identify the first, second, third, and/or forth sets of versions. In some implementations, the first set of versions may correspond to versions of the AUT: (1) which were tested similarly to the version corresponding to the first test execution (hereinafter "FTE Version") (e.g., included similar test steps), and (2) provided similar application functionality in response to the test steps, including the defect (e.g., provided similar application behavior). Since the defect was present in the first set as well as the FTE Version, those versions may not be considered to be regressions from the FTE Version. In some implementations, the second set of versions may correspond to versions of the AUT: (1) which were tested similar to the version corresponding to the FTE Version, and (2) provided similar application functionality in response to the test steps except did not include the defect. Since the defect is new, those versions may be considered to be regressions from the FTE Version. In some implementations, the third set of versions may correspond to versions of the AUT that (1) were tested similarly to the version corresponding to the FTE Version; and (2) did not provide similar application functionality in response to the test steps. Since the application functionality differs, those versions may not be considered to be regressions from the FTE Version. In some implementations, the fourth set of versions may correspond to versions of the AUT which did not include similar test steps. Since the test steps were not similar, those versions may not be considered to be regressions from the FTE Version.

Process 900 may also include causing a display of a regression interface including information related to at least one of the first set, the second set, the third set, and the fourth set (step S940). In some implementations, causing the display of the regression interface may include automatically identifying the second set of versions as a regression from a version associated with the first test execution. For example, automatic regression identification device 110 may cause the generation of a regression identification interface that provides a graphic or textual indication that the second set of versions are regressions. In some implementations, the graphic or textual indication may be a table, a chart, text, and/or any other suitable indication. An example of a regression identification interface is discussed in further detail below with respect to, for example, FIG. 11.

Figure 10:
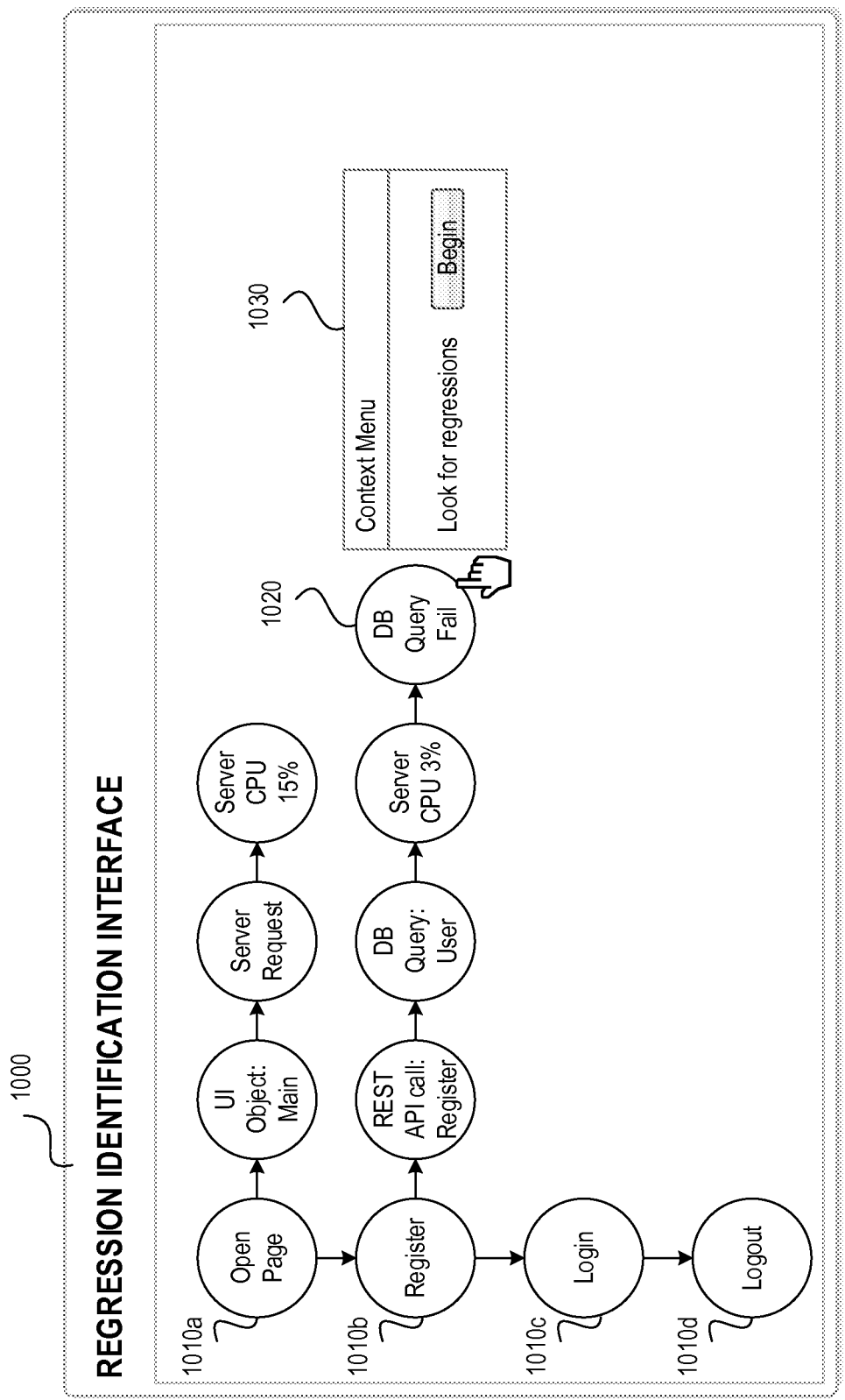
FIG. 10 is an example illustration of a regression interface consistent with disclosed implementations.

FIGS. 10 and 11 are illustrations example regression identification interfaces 1000 and 1100 consistent with disclosed implementations. For example, FIG. 10 is an example illustration of a regression identification interface 1000 displaying a visualization of data that has been captured and correlated using methods consistent with disclosed implementations and FIG. 11 is an example illustration of a regression identification interface 1100 displaying a visualization of regressions from a defect identified in regression identification interface 1000 consistent with disclosed implementations. In some implementations, automatic regression identification device 110 may cause the generation of interfaces 1000, 1100 using data obtained from, for example, a non-transitory machine-readable medium, repository 130, and/or another device or system. For example, automatic regression identification device 110 may obtain information related to the correlated data points stored in repository 130 using the methods described above. In some implementations, automatic regression identification device 110 may cause the display of interfaces 1000, 1100 on a display device.

As shown in FIG. 10, interface 1000 may include an area for displaying a graphical representation of a plurality of backbone nodes 1010*a*, 1010*b*, 1010*c*, 1010*d*. These backbone nodes may correspond to test steps performed during a particular test execution of the AUT. For example, the backbone nodes may correspond to user interactions with the AUT during the test. As shown in FIG. 10, the test steps include "Open Page," "Register," "Login," and "Logout." The text used to populate the graphic elements representing the nodes in the visualization (in this example, circles) may be obtained from at least a portion of the data captured and correlated using the methods described above. In the example illustrated in FIG. 10, the "Register" step resulted in a plurality of corresponding application behaviors (e.g., "REST API call: Register," "DB Query: User," "Server CPU 3%," and "DB Query Fail" (represented by visualized node 1020)). In the example shown in FIG. 10, a user may perform a user interaction with visualized node 1020 (e.g., hover over, click, etc.) to cause the generation of context menu 130. Context menu 130 may include an area that will allow a user to look for regressions (e.g., by clicking a button, such as the "Begin" button shown in FIG. 10). The interaction with the visualized node 1020 and/or context menu 130 may be transmitted to automatic regression identification device 110 as an identification of a defect of the AUT. Automatic regression identification device 110 may use the identification to identify versions of the AUT that are regressions from the version associated with the particular test illustrated in FIG. 10, using, for example, the methods described above. Once regressions have been identified, automatic regression identification device 110 may cause the display of the regression (or regressions) on the same regression identification interface and/or on a different regression identification interface, such as regression identification interface 1100 of FIG. 11.

As shown in FIG. 11, regression identification interface 1100 may include a display area that displays the regressions in a matrix or table format. However, regression identification interfaces consistent with disclosed examples may display information related to identified regressions in any suitable manner. In the example shown in FIG. 11, the table may include a plurality of columns 1110 and rows 1120. In this example, columns 1110 represent the versions of the AUT that were tested and compared with the test execution including the identified defect, while rows 1120 represent example criteria for determining regressions (e.g., whether a similar test was performed to the test including the defect, whether the application included similar functionality in response to the test steps, and whether the defect (or defect) was detected during the test). In the example shown in FIG. 11, the "x" may represent an occurrence of a particular event. Thus, in the example shown in FIG. 11, a number of different versions of the AUT were tested (0.1, 0.15, 0.2, 0.21, 0.22, 0.25, 0.5, 1.0, and 1.01) but only few included a similar test that was performed that resulted in similar application behavior (1.01, 1.0, 0.5, and 0.22). Of those, the defect was detected in two versions (1.01 and 0.5), but was not present in the remaining versions (0.22 and 1.0). Thus, when comparing version 1.01 to version 1.0, the identified defect was considered a regression since it was not present in the earlier version of the application (1.0) but was present in the later version (1.01). However, when comparing version 1.01 to version 0.5, the identified defect is not considered a regression since it was present in both versions of the AUT. As another example, when comparing version 1.01 to version 0.21, version 1.01 may be considered to be a regression since it was not present in the earlier version of the application (0.22) but was present in the later version (1.01). While in this example version 1.01 was compared to other application versions, any version of the application may be compared with other application versions to identify regressions.

The disclosed examples may include systems, devices, machine-readable storage media, and methods for automatically identifying regressions. For purposes of explanation, certain examples are described with reference to the components illustrated in FIGS. 1-11. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Moreover, as used in the specification and the appended claims, the singular forms "a," "an," and "the" are intended to include the plural forms as well, unless the context indicates otherwise. Additionally, although the terms first, second, etc. may be used herein to describe various elements, these elements should not be limited by this terms. Instead, these terms are used to distinguish one element from another.

Further, the sequence of operations described in connection with FIGS. 1-11 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order, including those described with respect to FIGS. 1-11. Thus, the present disclosure merely sets forth possible examples of implementations, and many variations and modifications may be made to the described examples. All such modifications and variations are intended to be included within the scope of this disclosure and protected by the following claims.

We claim:

1. A system for automatic regression identification comprising:
    a processor; and
    a non-transitory machine-readable storage medium storing instructions that are executable to cause the processor to:
        capture data points during test executions of an application under test, the data points including test action data and application action data;
        correlate each of the data points with a particular test execution of the test executions based on a sequence of events that occurred during the particular test execution, wherein to correlate each of the data points with the particular test execution, the instructions are executable to cause the processor to:
            categorize each of the data points into one of a plurality of types, including a first type;
            assign the data points categorized into the first type as backbone nodes of a directed acyclic graph; and
            connect remaining data points that are not categorized into the first type as data nodes to the backbone nodes via directed edges based on timestamps associated with the remaining data points; and
        automatically identify, based on the correlated data points, a regression between a first version of the application under test and a second version of the application under test.

2. The system of claim 1, wherein the regression is identified based on a similarity between: (1) first tests executed related to the first version and second tests executed related to the second version; and (2) first application behaviors in response to the first tests and second application behaviors in response to the second tests.

3. The system of claim 1, wherein, to identify the regression, the instructions are executable to cause the processor to:
identify a defect of the application under test, the defect occurring during a first test execution of the test executions;
identify, based on the correlated data points, a second test execution of the test executions, the second test execution having a similar test identification to a test identification of the first test execution; and
determine the regression by comparing, based on the correlated data points, the first test execution with the second test execution, the first test execution including a first set of test steps and a first set of application behavior, and the second test execution including a second set of test steps and a second set of application behavior.

4. The system of claim 3, wherein the comparing of the first test execution with the second test execution is based on a generalized data sequence.

5. The system of claim 3, wherein, to determine the regression by comparing, based on the correlated data points, the first test execution with the second test execution, the instructions are executable to cause the processor to:
determine whether the first set of test steps are a same as the second set of test steps;
determine, using a similarity algorithm, whether the first set of application behavior and the second set of application behavior are similar; and
determine whether the defect occurs during the second test execution.

6. The system of claim 5, wherein the instructions are executable to cause the processor to automatically identify the regression in response to determinations that the first set of test steps are the same as the second set of test steps, the first set of application behavior is similar to the second set of application behavior, and the defect does not occur during the second test execution.

7. The system of claim 6, wherein the first test execution occurs after the second test execution.

8. The system of claim 1, wherein the instructions are executable to cause the processor to:
assign metadata as vertices connected to the backbone nodes; and
assign tags to the directed edges to identify a type of relation between the vertices.

9. The system of claim 8, wherein to identify the regression, the instructions are executable to cause the processor to:
receive an indication of a defect of the first version of the application under test, the defect occurring during a first test execution of the test executions, the first test execution being associated with a first set of backbone nodes of the backbone nodes of the directed acyclic graph;
query the directed acyclic graph to identify a second set of backbone nodes that are similar to the first set, the second set of backbone nodes being associated with a second test execution of the second version of the application under test;

compare data nodes, metadata, and tags corresponding to the first test execution to data nodes, metadata, and tags corresponding to the second test execution; and
automatically identify the regression by determining, based on the comparison, that (1) the defect occurred during the first test execution and did not occur during the second test execution; and (2) there was no difference in behavior of the application under test during the first test execution and the second test execution.

10. A non-transitory machine-readable storage medium including instructions which, when executed by a processor, cause the processor to:
receive an indication of a defect of an application under test, the defect occurring during a first test execution of a plurality of test executions, the first test execution being associated with a first test identification;
query a correlated data structure to identify an initial set of test executions of the plurality of test executions, the initial set of test executions having a same test identification as the first test identification;
narrow, based on the correlated data structure, the initial set of test executions to generate a narrowed set of test executions, the narrowed set of test executions being test executions that experience similar application behavior in response to the first test execution but not including the defect; and
automatically identify each version of the application under test corresponding to the narrowed set of test executions as a regression from a version of the application under test tested during the first test execution.

11. The non-transitory machine-readable storage medium of claim 10, wherein the correlated data structure includes data points that have been correlated with a particular test execution of the plurality of test executions, each of the data points being correlated based on a sequence of events that occurred during the particular test execution.

12. The non-transitory machine-readable storage medium of claim 10, wherein the indication of the defect is received via an interaction with a regression interface.

13. A computer-implemented method comprising:
receiving an indication of a defect of an application under test, the defect occurring during a first test execution of a plurality of test executions of the application under test;
accessing, by a processor, data from a correlated data structure related to a plurality of test executions, the correlated data structure including a generalized data sequence corresponding to a sequence of test steps leading up to the defect;
identifying, by the processor, using the data from the correlated data structure:
a first set of versions of the application under test where the generalized data sequence and the defect occurred;
a second set of versions of the application under test where the generalized data sequence occurred but the defect did not occur;
a third set of versions of the application under test where the generalized data sequence occurred only for backbone nodes of the correlated data structure; and
a fourth set of versions of the application under test where the generalized data sequence did not occur; and causing, by the processor, a display of a regression interface including information related to at least one of the first set, the second set, the third set and the fourth set.

14. The computer-implemented method of claim 13, wherein the backbone nodes represent data captured during the plurality of test executions, wherein the data corresponds with an interaction with a user interface of the application under test.

15. The computer-implemented method of claim 13, wherein causing the display of the regression interface includes automatically identifying the second set of versions of the application under test as regressions from a version associated with the first test execution.

16. The computer-implemented method of claim 13, further comprising:
   capturing data points during the plurality of test executions of the application under test;
   correlating each of the data points with a particular test execution of the test executions to generate the correlated data structure; and
   identifying, based on the correlated data points, a regression between the first set of versions of the application under test and the second set of versions of the application under test.

17. The computer-implemented method of claim 16, wherein correlating each of the data points with the particular test execution comprises:
   categorizing each of data points into one of a plurality of types, including a first type;
   assigning the data points categorized into the first type as the backbone nodes of a directed acyclic graph; and
   connecting remaining data points that are not categorized into the first type as data nodes to the backbone nodes via directed edges based on timestamps associated with the remaining data points.

18. The computer-implemented method of claim 17, wherein correlating each of the data points with the particular test execution further comprises:
   assigning metadata as vertices connected to the backbone nodes; and
   assigning tags to the directed edges to identify a type of relation between the vertices.

19. The non-transitory machine-readable storage medium of claim 11, wherein the instructions are executable to cause the processor to generate the correlated data structure, including instructions to cause the processor to:
   categorize each of the data points into one of a plurality of types, including a first type;
   assign the data points categorized into the first type as backbone nodes of a directed acyclic graph;
   connect remaining data points that are not categorized into the first type as data nodes to the backbone nodes via directed edges based on timestamps associated with the remaining data points;
   assign metadata as vertices connected to the backbone nodes; and
   assign tags to the directed edges to identify a type of relation between the vertices.

* * * * *